UNITED STATES PATENT OFFICE.

WALTER E. F. BRADLEY, OF NYACK, NEW YORK.

METALLURGICAL PROCESS.

1,422,734.    Specification of Letters Patent.    Patented July 11, 1922.

No Drawing.   Application filed September 4, 1918, Serial No. 252,587.   Renewed December 5, 1921. Serial No. 520,157.

*To all whom it may concern:*

Be it known that I, WALTER E. F. BRADLEY, a citizen of the United States, and resident of Nyack, in the county of Rockland and State of New York, have invented certain new and useful Improvements in a Metallurgical Process, of which the following is a specification.

In the reduction of ores by gaseous reducing agents, such as hydrocarbon gas, the reduced metal may have dissolved or occluded within it a remnant or trace of hydrogen gas which is detrimental to the quality of the metal produced. On account of the equilibria phenomena and the small quantities involved, it is not directly a simple matter to drive off or remove this remaining gas by mere heating.

The present invention provides a process by which the hydrogen remaining after reduction can be effectively removed from the molten reduced metal. The process may also be employed for introducing carbon into the composition of the product. I shall describe a specific example of the invention with respect to the production of high grade steel, which will enable others to fully understand the principles involved.

In reducing iron ores with, for example, natural gas or methane, the reaction sets free hydrogen, which tends to remain in the reduced charge and form minute bubbles or otherwise affect the product adversely. Furthermore the use of the hydrocarbon gas, as a source of carbon to bring the product up to the desired composition of steel, also has the same disadvantage. Whether the reduction is accomplished by a hydrocarbon gas or not, the addition of carbon to the reduced metal is more easily and more accurately accomplished by the process herein disclosed than by the present practice of adding pig iron or other carbonizing agents.

According to my invention I add to the reduced metal a mixture of metal oxide and free carbon. Where it is not desired to carbonize the metal, the mixture will contain sufficient carbon to reduce the metal oxide, whereas if the carbon content of the product is to be increased, the quantity of carbon in the mixture will be correspondingly in excess of the amount required for reducing the oxide. In any case, the reduction of the oxide produces, at the temperature of molten iron, carbon monoxide gas which, on account of its freedom from hydrogen exerts a strong tendency to absorb or take up the hydrogen gas from the molten metal. The action of the carbon monoxide gas in bubbling up through the molten charge tends furthermore to facilitate the escape of the hydrogen by its own volatility. This addition of metal oxide and carbon is best introduced after the slag has been drawn off and, needless to say, should not in any case be followed by further introduction of the gaseous reducing agent into the charge.

Where hydrocarbon gas is available for use as a reducing agent, it is at the same time an advantageous source of carbon for producing the mixture of carbon and metal oxide, as shown, for example, in my co-pending application entitled Production of Carbon. The process of producing the mixture may thus form part of a comprehensive process in which the mixture is employed for removing the hydrogen gas from the molten metal, or bringing up the carbon content, or both, as will be seen. The process, as a whole, may be carried out as follows, reference being had to a specific example for the production of steel from iron ore: Iron oxide, such as the magnetic oxide is reduced by blowing through it a hydrocarbon gas such as methane or natural gas, with exclusion of air, while heating the charge to fusion in an electric furnace. Another quantity of magnetic oxide of iron is heated to about 800° C. or 1000° C. with exclusion of air and a stream of natural gas brought into contact with it whereby a mixture of oxide of iron and carbon is obtained. This mixture is at a high temperature but not at the fusion point of iron or iron oxide, and the hydrogen from the natural gas is not occluded or dissolved as in the case of the molten metal.

The oxide of iron is not reduced to metal in substantial quantities by the carbon or hydrogen under the conditions recited and the mixture may be controlled or adjusted so as to provide the desired quantity of carbon with respect to the oxygen content of the iron oxide for obtaining complete reduction of the iron oxide in the subsequent step. If it is desired to carbonize the iron to bring up the carbon content to the point required for the steel, the proportion of carbon with the iron oxide is correspondingly increased. This regulation may be secured, for example, by the time of treatment of the iron oxide with natural gas or, if analysis shows further modifications to be necessary, these can be readily made.

The mixture thus obtained need not be separated or cooled, but may be introduced directly into the reduced charge in the electric furnace, whereupon at the higher temperature the oxide of iron is reduced by the carbon and CO gas is given off. This CO gas being free from hydrogen takes up the hydrogen dissolved or occluded in the reduced iron and passes off with it.

In the action referred to, the addition dissolves or diffuses rapidly throughout the entire mass of reduced metal, so that the removal of hydrogen takes place thoroughly and uniformly. The bubbling action of the CO produced within the mass of molten metal further aids the escape of the hydrogen which was left in the reduced metal by the reducing action of the natural gas. Obviously, the purposes would be defeated if further quantities of natural gas were passed through the charge after the removal of hydrogen. The carbon produced by this process is substantially pure and being cheaply obtained is thus an especially advantageous agent for bringing up the carbon content of the steel desired.

I claim:

1. A metallurgical process, comprising reducing ores by a hydrocarbon gas, and introducing into the reduced molten charge an addition of metal oxide with free carbon.

2. A metallurgical process, comprising introducing a mixture of metal oxide and free carbon into a molten mass of reduced metal containing sufficient hydrogen to appreciably affect the properties of the metal.

3. A metallurgical process, comprising introducing into a molten mass of reduced metal containing hydrogen a mixture of metal oxide with sufficient free carbon to reduce the oxide.

4. A metallurgical process comprising introducing metal oxide and free carbon into reduced molten metal, containing hydrogen, the quantity of free carbon being sufficient to reduce the metal oxide and form carbon monoxide.

5. A metallugical process, comprising treating iron oxide with a hydrocarbon gas at a temperature in the neighborhood of 1000° C. with exclusion of air, reducing iron ore by hydrocarbon gas, discontinuing the supply of reducing gas when the charge is reduced, and introducing into the charge of reduced metal a mixture of iron oxide and carbon produced from the iron oxide and hydrocarbon gas, while maintaining the charge of reduced metal in molten condition.

6. A metallurgical process comprising introducing iron oxide and free carbon into a molten mass of reduced iron containing hydrogen.

7. A metallurgical process, comprising reducing iron ore by a hydrocarbon gas with fusion of the charge, treating oxide of iron with a hydrocarbon gas under exclusion of air at a temperature in the neighborhood of 1000° C. and introducing the resultant mixture of iron oxide and free carbon into the molten reduced metal.

8. A metallurgical process, comprising treating iron oxide with a hydrocarbon gas under exclusion of air at a temperature in the neighborhood of 1000° C. to obtain a mixture containing iron oxide and more carbon than sufficient to reduce the iron oxide and introducing the resultant mixture of iron oxide and free carbon into a molten mass of reduced iron to supply the desired carbon content.

WALTER E. F. BRADLEY.